(12) United States Patent
Mathur

(10) Patent No.: US 8,127,889 B1
(45) Date of Patent: Mar. 6, 2012

(54) NOISE REDUCTION SYSTEM FOR STRUCTURES

(75) Inventor: Gopal Prasad Mathur, Trabuco Canyon, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/559,710

(22) Filed: Sep. 15, 2009

(51) Int. Cl.
*E04B 1/84* (2006.01)
*B64C 1/40* (2006.01)
*E04B 1/82* (2006.01)
*E04B 1/74* (2006.01)
*B64C 1/00* (2006.01)

(52) U.S. Cl. .................. 181/290; 181/292; 244/119

(58) Field of Classification Search .................. 181/290, 181/292, 288, 214, 285, 286; 244/1 N, 119, 244/117 R, 123.13, 121
See application file for complete search history.

(56) References Cited

U.S. PATENT DOCUMENTS

| | | | | |
|---|---|---|---|---|
| 1,867,549 A * | 7/1932 | Brockmeyer | | 52/144 |
| 3,422,921 A * | 1/1969 | Warnaka | | 181/286 |
| 3,490,556 A | 1/1970 | Bennett, Jr. et al. | | |
| 3,670,843 A * | 6/1972 | Kelly et al. | | 181/292 |
| 3,910,374 A * | 10/1975 | Holehouse | | 181/292 |
| 3,948,346 A * | 4/1976 | Schindler | | 181/286 |
| 4,106,588 A * | 8/1978 | Moore et al. | | 181/284 |
| 4,241,806 A * | 12/1980 | Metzger | | 181/284 |
| 4,318,453 A * | 3/1982 | Rose et al. | | 181/292 |
| 4,384,634 A * | 5/1983 | Shuttleworth et al. | | 181/213 |
| 4,421,811 A * | 12/1983 | Rose et al. | | 428/116 |
| 4,465,725 A * | 8/1984 | Riel | | 428/116 |
| 4,522,284 A * | 6/1985 | Fearon et al. | | 181/292 |
| 4,560,028 A * | 12/1985 | Perret | | 181/288 |
| 4,667,768 A | 5/1987 | Wirt | | |
| 5,445,861 A * | 8/1995 | Newton et al. | | 428/116 |
| 5,473,122 A * | 12/1995 | Kodiyalam et al. | | 181/207 |
| 5,670,758 A * | 9/1997 | Borchers et al. | | 181/286 |
| 5,823,467 A * | 10/1998 | Mathur | | 244/1 N |
| 5,912,442 A * | 6/1999 | Nye et al. | | 181/292 |
| 5,975,237 A * | 11/1999 | Welch et al. | | 181/290 |
| 5,975,238 A * | 11/1999 | Fuchs et al. | | 181/295 |
| 5,997,985 A * | 12/1999 | Clarke et al. | | 428/116 |
| 6,053,275 A * | 4/2000 | Leonetti et al. | | 181/200 |
| 6,179,086 B1 * | 1/2001 | Bansemir et al. | | 181/292 |
| 6,182,787 B1 * | 2/2001 | Kraft et al. | | 181/292 |
| 6,183,837 B1 * | 2/2001 | Kim | | 428/118 |
| 6,203,656 B1 * | 3/2001 | Syed | | 156/292 |
| 6,220,388 B1 * | 4/2001 | Sanborn | | 181/290 |
| 6,266,427 B1 * | 7/2001 | Mathur | | 381/353 |
| 6,536,556 B2 | 3/2003 | Porte et al. | | |
| 6,569,509 B1 * | 5/2003 | Alts | | 428/73 |
| 7,267,196 B2 * | 9/2007 | Mathur | | 181/208 |
| 7,419,031 B2 * | 9/2008 | Liguore et al. | | 181/210 |
| 2005/0194210 A1 * | 9/2005 | Panossian | | 181/293 |
| 2006/0208135 A1 * | 9/2006 | Liguore et al. | | 244/117 R |
| 2008/0128202 A1 * | 6/2008 | Palumbo et al. | | 181/292 |
| 2009/0173571 A1 * | 7/2009 | Keller | | 181/292 |
| 2010/0170746 A1 * | 7/2010 | Restuccia et al. | | 181/290 |

* cited by examiner

*Primary Examiner* — Edgardo San Martin
(74) *Attorney, Agent, or Firm* — Yee & Associates, P.C.

(57) ABSTRACT

A method and apparatus are present for reducing noise. The apparatus comprises a core and a face sheet. The core is configured to reduce a speed of shear waves traveling through the core. The face sheet is located over a first surface of the core and is configured to reduce a speed of bending waves traveling through the face sheet. A second surface of the core is configured for attachment to a surface of a structure.

20 Claims, 5 Drawing Sheets

NOISE REDUCTION SYSTEM FOR STRUCTURES

BACKGROUND INFORMATION

1. Field

The present disclosure relates generally to noise and, in particular, to reducing noise generated by a structure. Still more particularly, the present disclosure relates to a method and apparatus for reducing noise generated by composite and metallic structures.

2. Background

Traditionally, existing aircraft have been constructed of metallic structures. However, currently, aircraft are being designed and manufactured with greater and greater percentages of composite structures. Metallic structures are structures that are comprised of one type of metallic material. Composite structures are comprised of composite materials. A composite material is a material made from two or more materials with different physical and/or chemical properties that remain separate and distinct on a macroscopic level within the finished structure.

Some aircraft may have more than 50 percent of their primary structures made from composite materials. Composite materials are used in aircraft to decrease the weight of the aircraft. This decreased weight improves performance features, such as payload capacities and fuel efficiencies. Further, composite materials provide longer service life for various components in an aircraft.

The amount of noise present in an aircraft is a concern with respect to providing a pleasant travel experience and a desired level of comfort for passengers. For example, it is desirable to minimize the amount of noise in the interior of an aircraft, such as a cabin.

Although reductions in weight are obtained through the use of composite structures, these lighter weight composite structures have a higher stiffness as compared to metallic structures. This higher stiffness and reduced weight results in an increased amount of noise radiated from these composite structures.

Controlling the noise in the interior of aircraft with either or both composite and metallic structures poses a number of technical challenges. For example, the level of noise generated by composite structures may be determined by the resonant modes of vibration of the composite structures. These resonant modes of vibration pose technical challenges when trying to control the noise generated by the composite structures.

As another example, a metallic structure in an aircraft follows mass law. In the example of a metallic structure, mass law specifies that a reduction in noise generated by the metallic structure of about six decibels may be achieved by substantially doubling the mass of the metallic structure. This doubling of mass adds undesired weight to the aircraft. Further, in controlling noise, various factors, such as weight, cost, and system performance, are taken into account.

Currently, noise is controlled in the interior of the aircraft using a noise control system that has several elements. These elements may include, for example, damping tiles, fiberglass blankets, acoustic foam, trim panels, isolators, and/or other suitable elements. For example, a layer of damping tiles may be placed on and attached to the inside skin of an aircraft. These damping tiles may contain a viscoelastic layer configured to convert vibrations of the inside skin of the aircraft into heat by absorbing the vibrations. This absorption causes a reduction in noise generated from the inside skin of the aircraft. Typically, damping tiles that absorb vibrations at frequencies above about 500 Hertz provide a reduction in noise from about three decibels to about seven decibels. Fiberglass blankets are placed over these damping tiles to provide absorption of noise. As a result, these fiberglass blankets provide additional reductions in noise.

Trim panels are panels seen inside the cabin. These trim panels are typically placed as another layer after the fiberglass blanket. These trim panels also help reduce noise in the interior of the aircraft. Isolators may be used to mount the trim panels to the structure of the aircraft. These isolators also may reduce noise. In some cases, foam may be used in place of or in addition to the fiberglass blankets to reduce noise. All of these components, however, add weight and cost to the aircraft.

With the increased noise generated by composite structures, thicker materials or additional elements may be used to reduce the noise in the interior of the aircraft. These solutions, however, further increase the weight and cost of the aircraft. Additionally, increased time is needed to manufacture aircraft because of the labor needed to install these components. For example, the process of adding damping tiles and fiberglass blankets is labor intensive in addition to adding undesired weight. Also, damping tiles are expensive and are individually installed on each skin panel.

Therefore, it would be advantageous to have a method and apparatus which takes into account one or more of the issues discussed above, as well as possibly other issues.

SUMMARY

In one advantageous embodiment, an apparatus comprises a core and a face sheet located over a first surface of the core. The core is configured to reduce the speed of shear waves traveling through the core. The face sheet is configured to reduce the speed of bending waves traveling through the face sheet. A second surface of the core is configured for attachment to a surface of a structure.

In another advantageous embodiment, a method is present for reducing noise. A structure is identified for noise reduction. A number of noise reduction devices are attached to the structure in which each noise reduction device in the number of noise reduction devices comprises a core and a face sheet located over a first surface of the core. The core is configured to reduce a speed of shear waves traveling through the core. The face sheet is configured to reduce a speed of bending waves traveling through the face sheet. A second surface of the core is configured for attachment to a surface of the structure.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
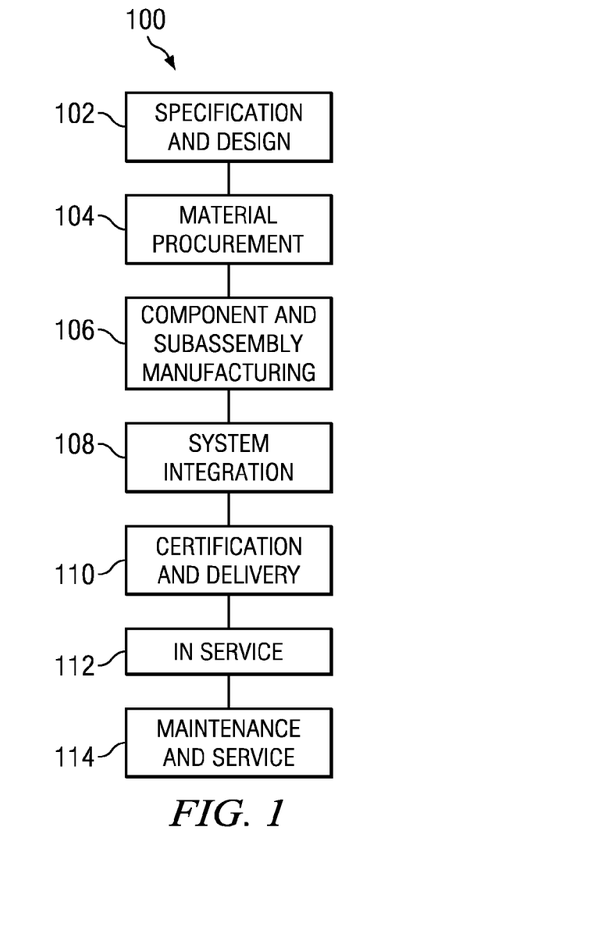
FIG. 1 is an illustration of an aircraft manufacturing and service method in accordance with an advantageous embodiment.
Figure 2:
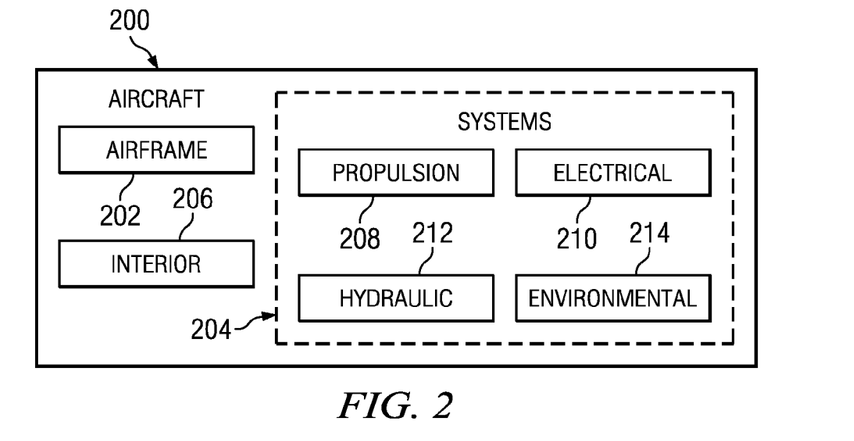
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that the lighter weight composite structures reduce the weight of an aircraft but have a higher stiffness as compared to metallic structures. As a result, these composite structures generate more noise as compared to metallic structures.

The different advantageous embodiments recognize and take into account that one solution that may reduce the use of existing noise reduction components is to design the composite structures in a manner such that they reduce the amount of noise generated by the components. For example, the different advantageous embodiments recognize and take into account that different types of honeycomb cores are often formed within a composite structure. The use of honeycomb cores may reduce noise generated by the composite structure. The different advantageous embodiments recognize and take into account, however, that these types of structures may have a thickness that is greater than desired to provide the desired reduction in noise.

The different advantageous embodiments also recognize and take into account that another solution is to change the physics of the waves traveling through structures. The different advantageous embodiments recognize and take into account that reducing the speed of the waves propagating in these structures significantly reduces the generation of noise.

For example, waves traveling in structures include bending waves and shear waves. At least one of bending waves and shear waves propagating through a structure may be reduced in speed by attaching an apparatus or other device to the structure. In one or more of the different advantageous embodiments, an apparatus comprises a core and a face sheet located over a first surface of the core. The core is configured to reduce the speed of shear waves traveling through the core. The face sheet is configured to reduce the speed of bending waves traveling through the face sheet. The second surface of the core is configured for attachment to the surface of a structure.

In some advantageous embodiments, the structure is a composite structure. Of course, in other advantageous embodiments, the structure may be a metallic structure.

Figure 3:
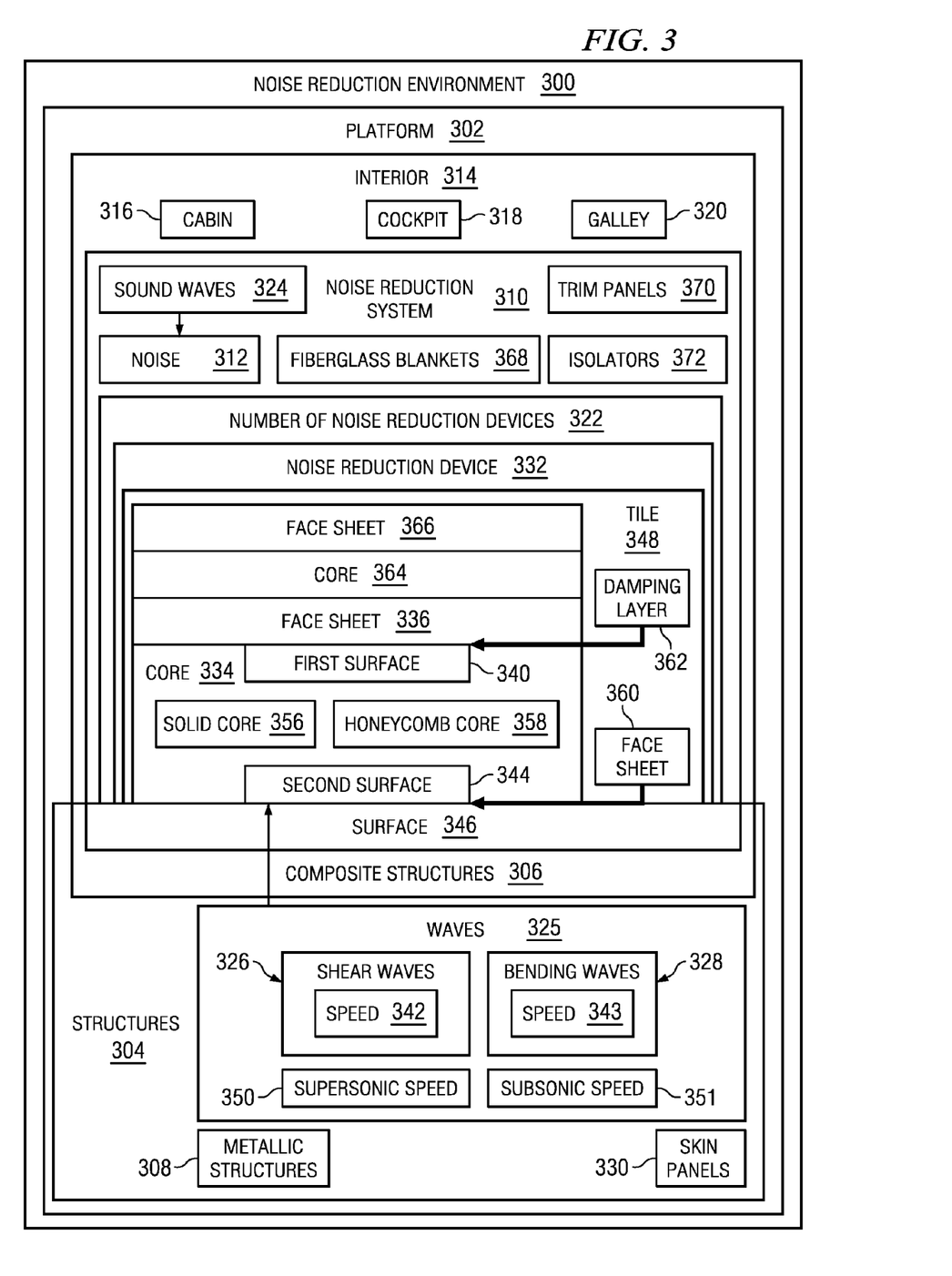
FIG. 3 is an illustration of a noise reduction environment in accordance with an advantageous embodiment.

With reference now to FIG. 3, an illustration of a noise reduction environment is depicted in accordance with an advantageous embodiment. As illustrated, noise reduction environment 300 is an example of an environment that may be implemented with aircraft 200 in FIG. 2.

Noise reduction environment 300 includes platform 302, which may take the form of aircraft 200 in FIG. 2. Platform 302 is comprised of structures 304. In these illustrative examples, structures 304 include at least one of composite structures 306 and metallic structures 308.

Noise reduction system 310 is associated with platform 302 to reduce noise 312 within interior 314 of platform 302. A first component may be considered to be associated with a second component by being secured to the second component, bonded to the second component, fastened to the second component, and/or connected to the second component in some other suitable manner. The first component also may be connected to the second component through using a third component. The first component also may be considered to be associated with the second component by being formed as part of and/or as an extension of the second component.

Interior 314 may include, for example, without limitation, cabin 316, cockpit 318, galley 320, and/or other suitable interior locations for platform 302.

In these illustrative examples, noise reduction system 310 includes number of noise reduction devices 322. Number of noise reduction devices 322 may be attached to composite structures 306, in these depicted examples, to reduce noise 312 generated by sound waves 324. Number of noise reduction devices 322 may be associated with structures 304. In other words, number of noise reduction devices may be attached directly or indirectly to structures 304. Structures 304 include, for example, without limitation, skin panels 330.

In these examples, sound waves 324 radiate from structures 304 and/or platform 302. Sound waves 324 are formed when waves 325 pass through surface 346 of structures 304 and radiate into the air of interior 314. Waves 325 include shear waves 326 and bending waves 328. In these illustrative examples, noise 312 is generated by the coupling of the energy present in bending waves 328 with the energy present in shear waves 326 when sound waves 324 are formed.

In this illustrative example, noise reduction device 332 in number of noise reduction devices 322 comprises core 334 and face sheet 336. In these examples, face sheet 336 is a layer that covers core 334. Face sheet 336 may be directly attached to core 334 or indirectly attached with some other number of layers between core 334 and face sheet 336 in these illustrative examples.

Core 334 is configured to reduce speed 342 of shear waves 326 traveling through core 334. Face sheet 336 is located over first surface 340 of core 334. Face sheet 336 is configured to reduce speed 343 of bending waves 328 traveling through face sheet 336. Second surface 344 of core 334 is configured for attachment to surface 346 of composite structures 306. First surface 340 is substantially parallel to second surface 344 in these examples.

Noise reduction device 332 may have various shapes and sizes. In one illustrative example, noise reduction device 332 may take the form of tile 348. For example, without limitation, noise reduction device 332 may be square, rectangular, hexagonal, irregular, or some other suitable shape.

In these illustrative examples, speed 342 of shear waves 326 and/or speed 343 of bending waves 328 are reduced from supersonic speed 350 to subsonic speed 351. In these illustrative examples, supersonic speed 350 is a speed that is greater than the speed of sound. This speed is about 767 miles per hour in dry air at about 68 degrees Fahrenheit or about 343 meters per second at about 20 degrees Centigrade. Speeds lower than about 767 miles per hour are subsonic speeds.

In these illustrative examples, shear waves 326 are waves that move in a direction substantially perpendicular to surface 346 of structures 304, first surface 340, and/or second surface 344 of core 334. Shear waves 326 cause vibrations in core 334 that are substantially perpendicular to the movement of shear waves 326. The movement of shear waves 326 through structures 304 and/or core 334 is taken into account in determining the configuration for core 334 in these illustrative examples. Bending waves 328 are waves that move substantially parallel, to or substantially in the direction of, surface 346 of structures 304 and/or face sheet 336 in these examples.

In these illustrative examples, noise reduction device 332 reduces noise 312 in interior 314 of platform 302 in a different manner from other currently used devices, such as damping tiles, which employ viscoelastic materials. Currently used damping tiles with viscoelastic materials convert energy produced by the vibrations in a structure into heat. This conversion may be achieved through the deformation of shear waves through the structure.

In the different advantageous embodiments, number of noise reduction devices 322 reduces the speed of waves 325 by an amount that reduces noise 312 within interior 314 of platform 302. The speed of waves 325 may be reduced to a speed less than the speed of sound in these examples. For example, the speed of waves 325 may be reduced to a speed substantially two-thirds the speed of sound. This reduction in speed may be desired because number of noise reduction devices 322 is comprised of materials that are less stiff as compared to materials in structures 304. As a result, waves 325 slow down in speed when propagating from structures 304 to number of noise reduction devices 322.

In particular, with composite structures 306, core 334 may be configured to reduce the speed of waves 325 with respect to the resonant modes of bending waves 328. With metallic structures 308, core 334 may be configured to reduce the speed of waves 325 with respect to the non-resonant modes of bending waves 328. In this manner, number of noise reduction devices 322 is configured to transfer the energy in bending waves 328 traveling through structures 304 into energy in shear waves 326. More specifically, the energy in bending waves 328 traveling at supersonic speed 350 may be transferred into energy in shear waves 326 traveling at subsonic speed 351. One result of this type of transfer of energy from bending waves 328 into energy in shear waves 326 is a reduction in noise 312 in interior 314.

In the different advantageous embodiments, core 334 may take a number of different forms. For example, core 334 may be, without limitation, solid core 356, honeycomb core 358, or some other suitable type of core. In some examples, core 334 may be a truss core, an X-core, a K-core, a Kevlar™ core, a Nomex™ core, or some other suitable type of core. These different cores may be comprised of materials such as, for example, without limitation, foam, paper, melamine foam, polymeric compound foam, aramid fiber paper, para-aramid fiber paper, and/or some other suitable material. Further, the different cores may be comprised of materials that allow shear waves 326 to travel through core 334 with subsonic speed 351.

Face sheet 336 may be constructed from a number of different types of materials. The particular material is selected as one that reduces bending waves 328 traveling through face sheet 336. These materials may include materials such as, for example, without limitation, aluminum, other types of metals, glass, carbon fiber, graphite fiber, Kevlar® fiber, composite materials, and/or other suitable types of materials. The thickness of face sheet 336 may be selected based on the type of material, weight, environmental factors, vibration frequencies, and/or other suitable factors.

In addition to number of noise reduction devices 322, noise reduction system 310 also may include other components, such as fiberglass blankets 368, trim panels 370, and isolators 372. Fiberglass blankets 368, however, may be reduced in thickness with the increased efficiency of noise reduction by number of noise reduction devices 322. This reduction in the thickness of fiberglass blankets 368 decreases the cost and weight of noise reduction system 310.

Of course, in other advantageous embodiments, noise reduction device 332 may have additional layers. For example, tile 348 also may include face sheet 360, which may be located between second surface 344 and surface 346 of composite structures 306.

In addition, in some illustrative examples, damping layer 362 may be located between face sheet 336 and core 334. Damping layer 362 may be, for example, without limitation, a viscoelastic material. A viscoelastic material is a material that exhibits both viscous and elastic characteristics when undergoing deformation. In these illustrative examples, damping layer 362 may be implemented using, for example, a viscoelastic layer. This viscoelastic layer may be a 3M™ Ultra-Pure Viscoelastic Damping Polymer, which is available from 3M Company.

In addition, in other advantageous embodiments, additional cores and face sheets may be layered to form noise reduction device 332. For example, without limitation, structures 304 may have a thickness or stiffness such that an additional core may be used to reduce noise 312. In this depicted example, core 364 may be located over face sheet 336 with face sheet 366 located over core 364.

The illustration of noise reduction environment 300 in FIG. 3 is not meant to imply physical or architectural limitations to the manner in which different advantageous embodiments may be implemented.

For example, in some advantageous embodiments, noise reduction system 310 may include other devices in addition to the ones illustrated to reduce noise 312. For example, active noise reduction devices may be employed in noise reduction system 310 to cancel waves 325 to reduce noise 312.

In some advantageous embodiments, number of noise reduction devices 322 may be used in other types of platforms other than aircraft. For example, these platforms may be selected from one of a mobile platform, a stationary platform, a land-based structure, an aquatic-based structure, a space-based structure, a surface ship, a tank, a personnel carrier, a train, a spacecraft, a space station, a submarine, an automobile, a power plant, a house, a manufacturing facility, an office building, and/or some other suitable type of platform. As one particular example, number of noise reduction devices 322 may be used as a layer in drywall for buildings, on housings for heavy machinery, for a hull of a boat, or for other suitable types of platforms.

Figure 4:
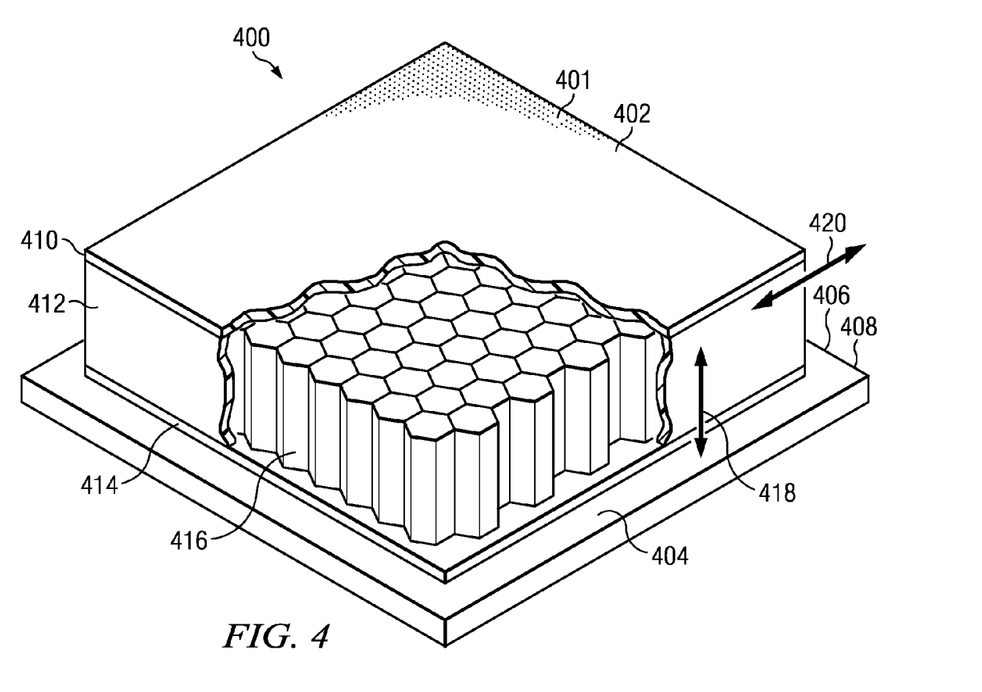
FIG. 4 is an illustration of a portion of a noise reduction environment in accordance with an advantageous embodiment.

Turning now to FIG. 4, an illustration of a portion of a noise reduction environment is depicted in accordance with an advantageous embodiment. In this illustrative example, a portion of noise reduction environment 400 is illustrated. Noise reduction environment 400 is an example of one implementation for noise reduction environment 300 in FIG. 3.

In this depicted example, noise reduction device 401 takes the form of tile 402. As depicted, tile 402 is associated with surface 404 of structure 406. In this illustrative example, structure 406 takes the form of skin panel 408.

Tile 402 is shown in a partially exposed perspective view. Tile 402 is comprised of face sheet 410, core 412, and face sheet 414. Face sheet 410 may be referred to as an outer face sheet, while face sheet 414 may be referred to as an inner face sheet. Face sheet 414 is attached to surface 404 of skin panel 408 in these examples. Core 412 is located between face sheet 410 and face sheet 414. Core 412, in this example, takes the form of honeycomb core 416.

In these illustrative examples, honeycomb core 416 is configured to reduce a speed of shear waves traveling through honeycomb core 416 in the direction of arrow 418. Face sheet 410 and face sheet 414 are configured to reduce a speed of bending waves traveling through face sheet 410 and face sheet 414 in the direction of arrow 420.

In these illustrative examples, shear waves travel through core 412 and affect the level of noise that radiates from face sheet 410 of tile 402 and cause noise that may be heard by a passenger. The speed of shear waves in core 412 may be defined as follows:

$$c_s = \left[\frac{G_c}{\rho_c}\right]^{1/2}$$

where $C_s$ is the speed of shear waves, $G_c$ is the shear modulus, and $\rho_c$ is the density of the core.

The speed of shear waves in core 412 may be reduced by selecting materials from configurations for core 412. For example, in this illustrative example, core 412 takes the form of honeycomb core 416. In other illustrative examples, core 412 may be a solid core.

Noise reduction device 401 is not required to carry the structural and dynamic loads in skin panel 408. As a result, core 412 may be constructed with a shear modulus selected to allow shear waves to travel through core 412 at subsonic speeds. The particular material in the configuration selected for core 412 may be made by selecting the shear modulus and density for core 412 such that the speed of shear waves is reduced when the shear waves and/or bending waves travel from structure 406 to core 412 in tile 402.

Similarly, the materials in the configurations selected for face sheet 410 and face sheet 414 are made by selecting elastic moduli and densities for face sheet 410 and face sheet 414 such that the speed of bending waves is reduced when the bending waves and/or shear waves travel through face sheet 414 and face sheet 410.

The speed of bending waves traveling through face sheet 410 and face sheet 414 may be given by:

$$c_b = (\omega)^{1/2}\left[\frac{E_f h^2}{12\rho_f(1-v^2)}\right]^{1/4}$$

where, $c_b$ is the speed of bending waves, $\omega$ is radian frequency or $2\pi$ times frequency, $E_f$ is the elastic modulus, $\rho_f$ is the density of material for the face sheet, $v$ is Poisson's ratio, and $h$ is the thickness of the face sheet. This equation gives the speed of bending waves in face sheets made out of isotropic materials. Isotropic materials are materials which have the same properties in all directions.

The speed of bending waves in face sheets made out of orthotropic materials, such as orthotropic composite materials, may be calculated by determining a bending stiffness using finite element models. Orthotropic materials are materials with properties that may vary, depending on the direction in which the properties are measured. In other words, orthotropic materials are anisotropic materials.

In these examples, at low frequencies, the generation of noise is determined by the bending and/or vibrations of substantially all of tile 402. At high frequencies, the bending in face sheet 410 determines the level of noise generated. In the mid-frequencies, shear waves determine the level of noise generated. Typically, in these examples, low frequencies are frequencies that are lower than about 400 Hertz. Mid-frequencies are from about 400 Hertz to about 1000 Hertz. High frequencies are frequencies that are greater than about 1000 Hertz. In other advantageous embodiments, tile 402 may be designed such that the low frequencies, the mid-frequencies, and/or the high frequencies have different ranges of frequencies.

Figure 5:
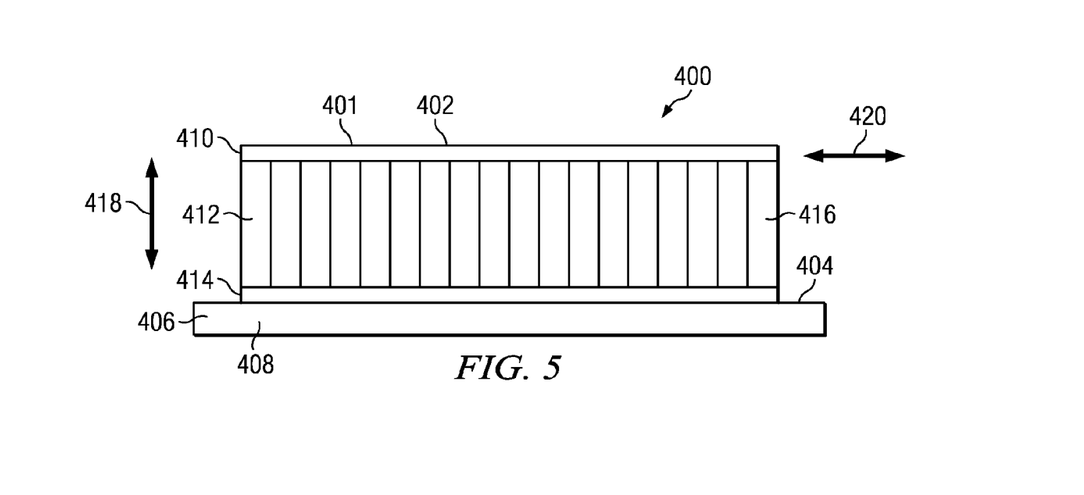
FIG. 5 is an illustration of a cross-sectional view of a portion of a noise reduction environment in accordance with an advantageous embodiment.

With reference now to FIG. 5, a cross-sectional view of a portion of a noise reduction environment is depicted in accordance with an advantageous embodiment. In this example, a cross-sectional view of noise reduction environment 400 from FIG. 4 is shown.

Figure 6:
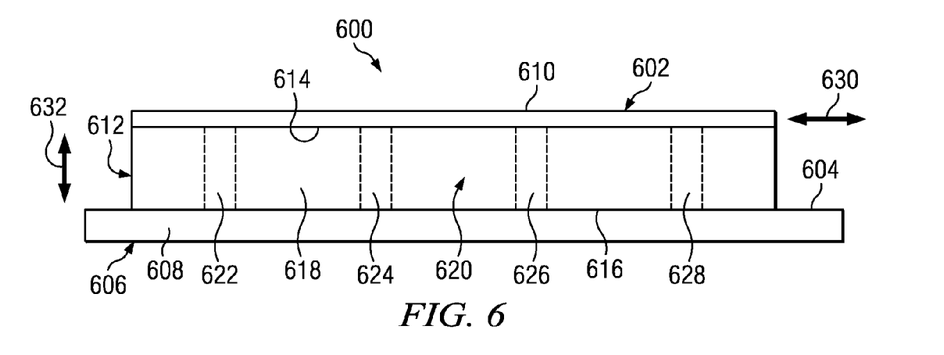
FIG. 6 is an illustration of a cross-sectional view of a portion of a noise reduction environment in accordance with an advantageous embodiment.

With reference now to FIG. 6, an illustration of a cross-sectional view of a portion of a noise reduction environment is depicted in accordance with an advantageous embodiment. In this example, noise reduction environment 600 is an example of another implementation for noise reduction environment 300 in FIG. 3. As depicted, noise reduction environment 600 includes tile 602, which may be associated with surface 604 of structure 606. In this illustrative example, structure 606 takes the form of skin panel 608.

In this illustrative example, tile 602 comprises face sheet 610 and core 612. Core 612 has side 614 and side 616. Additionally, in this illustrative example, side 616 of core 612 is directly attached to surface 604 of skin panel 608. Side 614 is attached to face sheet 610. In this illustrative example, core 612 takes the form of solid core 618. In this example, solid core 618 is comprised of material 620.

Core 612 may have channels 622, 624, 626, and 628. Channels 622-628 may be open air or may contain another type of material. The size and dimensions of these channels are based on the configuration of tile 602. In some advantageous embodiments, channels 622-628 may have both ends of the channels open-ended, one end of the channels open-ended, or both ends of the channels closed-ended. Further, a mix of different types of channels may be present within core 612.

In this illustrative example, waves traveling through structure 606 may travel into tile 602. Waves traveling from structure 606 into tile 602 are reduced in speed. This reduction in speed is caused by bending and/or shear movement within tile 602. In these illustrative examples, face sheet 610 causes a reduction in speed of waves traveling through face sheet 610 in a direction of arrow 630. These types of waves are bending waves. Core 612 reduces the speed of shear waves traveling in the direction of arrow 632 through core 612. As a result, waves traveling through skin panel 608 may be slowed down in speed by tile 602. This reduction in speed reduces the amount of noise that may be generated by or heard from structure 606.

The illustration of tile 402 in noise reduction environment 400 in FIG. 4 and tile 602 in noise reduction environment 600 are not meant to imply physical or architectural limitations to the manner in which other noise reduction environments may be implemented. Other components, in addition to or in place of the ones illustrated, may be used. Also, some components may be unnecessary in some advantageous embodiments.

For example, additional tiles in addition to tiles 402 and 602 may be present in noise reduction environments 400 and 600. Additionally, in yet other advantageous embodiments, a tile may have a number of cores and a number of face sheets in addition to the ones illustrated.

Figure 7:
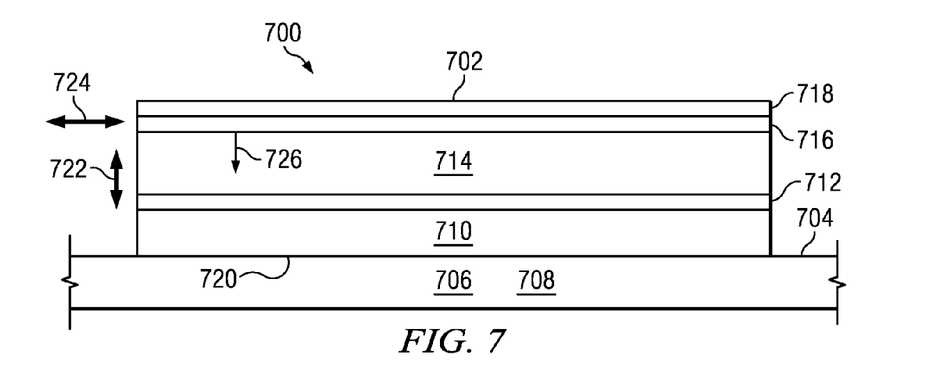
FIG. 7 is an illustration of a noise reduction environment in accordance with an advantageous embodiment.

Turning now to FIG. 7, an illustration of a noise reduction environment is depicted in accordance with an advantageous embodiment. In this illustrative example, noise reduction environment 700 is an example of another implementation for noise reduction environment 300 in FIG. 3.

In this illustrative example, noise reduction environment 700 includes tile 702 associated with surface 704 of structure 706. Structure 706 takes the form of skin panel 708.

Tile 702 includes core 710, face sheet 712, core 714, damping layer 716, and face sheet 718. Side 720 of core 710 is directly attached to surface 704 of structure 706. In other words, an intervening layer that is used for reducing noise is not present. Face sheet 712 is attached to core 710. Core 714 is located between damping layer 716 and face sheet 712. Face sheet 718 is formed on damping layer 716.

In these illustrative examples, core 714 and core 710 reduce a speed of shear waves traveling in the direction of arrow 722. Face sheet 712 and face sheet 718 reduce a speed of sound waves traveling in the direction of arrow 724. Damping layer 716 absorbs energy from vibrations in tile 702 due to the movement of shear waves.

Figure 8:
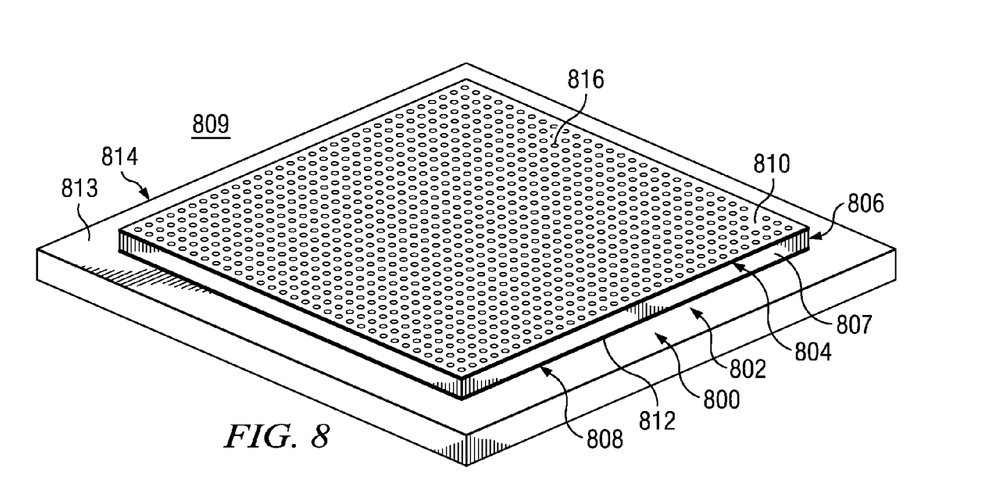
FIG. 8 is an illustration of a noise reduction device in accordance with an advantageous embodiment.

Turning now to FIG. 8, an illustration of a noise reduction device is depicted in accordance with an advantageous embodiment. In this illustrative example, noise reduction device 800 is an example of another implementation for noise reduction device 332 in FIG. 3.

In this illustrative example, noise reduction device 800 takes the form of tile 802. Tile 802 is an example of one implementation for tile 348 in FIG. 3. Tile 802 includes face sheet 804, core 806, and face sheet 808. Core 806 is solid core 807 in this example, instead of a honeycomb core, such as honeycomb core 416 in FIG. 4.

In this depicted example, side 810 of face sheet 804 may face environment 809. Environment 809 may be, for example, without limitation, an interior of an aircraft. Side 812 of face sheet 808 is associated with surface 813 of structure 814. Structure 814 may be, for example, a skin panel of the aircraft.

Face sheet 804 has plurality of holes 816 unlike face sheet 410 and face sheet 414 for tile 402 in FIG. 4. Plurality of holes 816 in face sheet 804 allows sound waves traveling in environment 809 to enter core 806. These waves may be dissipated in core 806. For example, a portion of the energy in the sound waves traveling in environment 809 may be converted to heat in core 806 by friction, and a portion of the energy in the sound waves may be converted into vibrations in tile 802. These conversions provide a reduction in noise.

In this manner, plurality of holes 816 in face sheet 804 allows a reduction in noise generated within environment 809. This reduction in noise may be in addition to a reduction in noise radiating from structure 814 provided by tile 802.

In other advantageous embodiments, core 806 may be a honeycomb core. When core 806 is a honeycomb core, core 806 may be tuned to a certain frequency to reduce the generation of noise.

Figure 9:
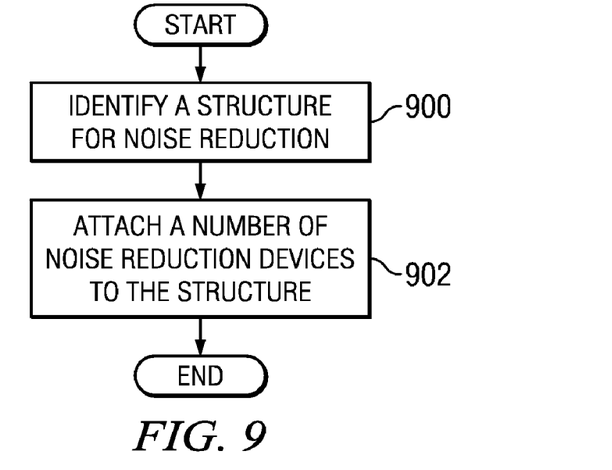
FIG. 9 is an illustration of a flowchart of a process for reducing the propagation of sound waves in accordance with an advantageous embodiment.

Turning now to FIG. 9, an illustration of a flowchart of a process for reducing the propagation of sound waves is depicted in accordance with an advantageous embodiment. The process illustrated in FIG. 9 may be implemented in a noise reduction environment, such as noise reduction environment 300 in FIG. 3.

The process begins by identifying a structure for noise reduction (operation 900). In operation 900, a structure, such as a skin panel in the fuselage of an aircraft, may be located. Thereafter, a number of noise reduction devices are attached to the structure (operation 902), with the process terminating thereafter. The number of noise reduction devices may be attached to the structure using an adhesive. This adhesive may be, for example, a pressure-sensitive adhesive. In other advantageous embodiments, fasteners may be used to attach the number of noise reduction devices to the structure.

Figure 10:
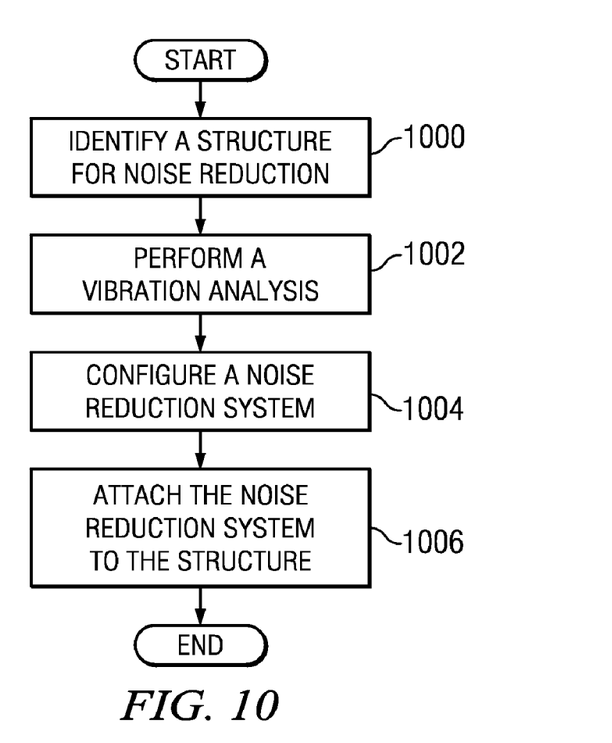
FIG. 10 is an illustration of a flowchart of a process for designing a noise reduction system in accordance with an advantageous embodiment.

With reference now to FIG. 10, an illustration of a flowchart for a process for designing a noise reduction system is depicted in accordance with an advantageous embodiment. The process illustrated in FIG. 10 may be implemented in a noise reduction system, such as noise reduction system 310 in noise reduction environment 300 in FIG. 3.

The process begins by identifying a structure for noise reduction (operation 1000). Thereafter, a vibration analysis is performed (operation 1002). In operation 1002, the vibration analysis may include determining the characteristics of vibrations that may be formed in the structure due to waves traveling through the structure. Further, this vibration analysis also may be performed for different components of a noise reduction device. For example, the characteristics of vibrations that may be formed in a face sheet and/or a core may be determined.

The process then configures a noise reduction system (operation 1004). The configuration in operation 1004 may involve taking into account, for example, without limitation, size constraints, weight constraints, a desired level of noise reduction, material constraints, and/or some other suitable factors. For example, the noise reduction system may be configured to have a number of noise reduction devices with cores comprised of a particular material. These cores may be configured to have a selected thickness to provide the desired level of noise reduction.

Further, configuring the number of noise reduction devices may involve selecting a particular number of cores, a particular number of face sheets, and/or a particular number of damping layers. Still further, configuring the number of noise reduction devices may involve selecting materials, thicknesses, and/or other suitable factors for the different components within the noise reduction system.

Thereafter, the process attaches the noise reduction system to the structure (operation 1006), with the process terminating thereafter.

Thus, the different advantageous embodiments provide a method and apparatus for reducing noise. In one advantageous embodiment, the apparatus comprises a core configured to reduce a speed of shear waves traveling through the core. Additionally, a face sheet is located over the first surface of the core. The face sheet is configured to reduce a speed of bending waves traveling through the face sheet. The second surface of the core is configured for attachment to a structure.

Thus, the noise reduction devices in the different advantageous embodiments reduce noise generated by a structure in a platform. The reduction in noise is achieved by changing the speed of waves traveling through a noise reduction device associated with the structure. For example, the speed of waves traveling through a structure may be at a supersonic speed. When these waves propagate into the noise reduction device, the noise reduction device reduces the speed to a subsonic speed. This reduction in speed may be achieved in the noise reduction device through the use of materials that are less stiff as compared to those in the structure. In this manner, noise may be reduced in the interior of platforms, such as aircraft. Further, noise that may emanate from a structure to other places, such as in a ship, a stadium, or other platforms, also may be reduced.

With one or more of the different advantageous embodiments, the use of other noise reduction elements may be avoided or reduced. The reduction or elimination of other noise reduction devices in a noise reduction system may reduce the weight and/or cost of these systems. Further, the reduction or elimination of other noise reduction devices may increase the payload and/or performance of a platform.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for reducing the speed of shear waves and bending waves passing through a structure comprising:
    a first core, the first core having a first surface and a second surface a damping layer located on a second surface of the first core;
    a first face sheet located over the damping layer and opposite the first core,
    a second face sheet located on a second surface of the first core;
    a second core located between the second face sheet and a surface of the structure;
    wherein the first core, the damping layer, the first face sheet, the second face sheet, and the second core reduce a speed of shear waves traveling through the structure and reduce a speed of bending waves traveling through the structure.

2. The apparatus of claim 1, wherein the first core and the second core reduce the speed of shear waves from a supersonic speed to a subsonic speed.

3. The apparatus of claim 1, wherein the first face sheet and the second face sheet reduce the speed of bending waves from a supersonic speed to a subsonic speed.

4. The apparatus of claim 1, wherein the core is selected from one of a solid core and a honeycomb core.

5. The apparatus of claim 1, wherein a number of channels are present in the core.

6. The apparatus of claim 1, wherein the core is comprised of a material selected from one of foam, paper, melamine foam, polymeric compound foam, aramid fiber paper, and para-aramid fiber paper.

7. The apparatus of claim 1, wherein the face sheet is comprised of a material selected from one of aluminum, metal, glass, carbon fiber, graphite fiber, Kevlar® fiber, and a composite material.

8. The apparatus of claim 1, wherein the core and the face sheet form a noise reduction device and further comprising:
    a number of additional noise reduction devices.

9. The apparatus of claim 1, wherein the core and the face sheet form a noise reduction device and further comprising:
    a fiberglass blanket located over the noise reduction device.

10. The apparatus of claim 8, wherein the noise reduction device is in a form of a tile.

11. The apparatus of claim 1, wherein the structure is selected from one of a composite structure and a metallic structure.

12. The apparatus of claim 1 further comprising:
    the structure, wherein the structure is for a platform selected from one of a mobile platform, a stationary platform, a land-based structure, an aquatic-based structure, a space-based structure, an aircraft, a surface ship, a tank, a personnel carrier, a train, a spacecraft, a space station, a submarine, an automobile, a power plant, a house, a stadium, a manufacturing facility, and an office building.

13. A method for reducing noise, the method comprising:
identifying a structure for noise reduction;
attaching a first set of noise reduction devices to the structure in which the first noise reduction device comprises a core having a first surface and a second surface, and a first face sheet disposed on the first surface of the core, and wherein the core is attached to the structure;
attaching a second set of noise reduction devices to the first set of noise reduction devices, the second set of noise reduction devices comprising a second core, a second face sheet, and a damping layer positioned between the second core and the second face sheet;
reducing a speed of shear waves traveling through the core; and
reducing a speed of bending waves traveling through the face sheet.

14. The method of claim 13, further comprising reducing the speed of shear waves traveling through the core from a supersonic speed to a subsonic speed, and reducing the speed of bending waves traveling through the face sheet from a supersonic speed to a subsonic speed.

15. The method of claim 13, further comprising the step of absorbing energy from vibrations in the noise reduction device due to the movement of shear waves.

16. The method of claim 13 further comprising:
placing a fiberglass blanket over the number of noise reduction devices.

17. The method of claim 13 wherein the noise reduction devices comprise tiles.

18. A system for reducing the speed of sound waves passing into a structure comprising:
a structure having a first surface;
shear waves traveling through the structure, the shear waves characterized by a speed;
bending waves traveling through the structure, the bending waves characterized by a speed;
a tile having a first surface and a second surface, wherein the first surface of the tile is attached to the first surface of the structure;
the tile comprising a first core having a first surface and a second surface; a first face sheet disposed on the first surface of the core; a second core disposed on the first face sheet, a damping layer disposed on the second core, and a second face sheet disposed on the damping layer;
wherein the speed of the shear waves traveling through the core is reduced; and
wherein the speed of the bending waves traveling through the face sheet is reduced.

19. The system of claim 18, wherein the first and the second face sheet comprise a material selected from the group consisting of metals, aluminum, glass, carbon fiber, graphite fiber, and, composite materials, and wherein the damping layer comprises a viscoelastic material.

20. The method of claim 13, wherein the first and the second face sheet comprise a material selected from the group consisting of metals, aluminum, glass, carbon fiber, graphite fiber, and, composite materials, and wherein the damping layer comprises a viscoelastic material.

* * * * *